United States Patent

[11] 3,581,173

[72] Inventors John L. Hood;
Joe H. Mc Gee, both of Charlottesville, Va.
[21] Appl. No. 831,340
[22] Filed June 9, 1969
[45] Patented May 25, 1971
[73] Assignee Sperry Rand Corporation

[54] LIGHT ACTUATED BRUSHLESS DC MOTOR
8 Claims, 4 Drawing Figs.
[52] U.S. Cl. .................................................. 318/254,
318/138
[51] Int. Cl. ..................................................... H02k 29/00
[50] Field of Search ......................................... 318/138,
254, 435

[56] References Cited
UNITED STATES PATENTS

| | | | |
|---|---|---|---|
| 3,257,594 | 6/1966 | Weigel ......................... | 318/138 |
| 3,280,396 | 10/1966 | Beck et al. ..................... | 318/138 |
| 3,353,076 | 11/1967 | Haines........................... | 318/138 |
| 3,354,367 | 11/1967 | Stockebrand ................. | 318/138 |
| 3,443,182 | 5/1967 | Graham......................... | 318/138 |
| 3,453,514 | 7/1969 | Rakes et al. ................... | 318/138 |
| 3,488,566 | 1/1970 | Fukuda ......................... | 318/138 |

*Primary Examiner*—G. R. Simmons
*Attorney*—S. C. Yeaton

ABSTRACT: A brushless DC motor contains an odd number of stator windings. A cylindrical member is mounted integrally on the rotor and contains a narrow, axially disposed reflecting stripe on its surface corresponding to each stator winding. One of the stripes may have a high degree of light reflectivity, the other stripes may have an intermediate degree of reflectivity, the cylindrical surface between the stripes has a low degree of reflectivity. A stationary light source is arranged to reflect a narrow beam of light from the cylindrical surface onto a sensor. Each burst of light reaching the sensor when a stripe traverses the light beam produces an electrical pulse output from the sensor which switches a sequence steering circuit into a new stable state. The steering circuit has a different stable state for each stator winding and is connected to energize a different individual stator winding for each state. Successive pulses from the sensor switch the steering circuit so as to energize individual stator windings in a cyclical sequence. A burst of light from the high reflectivity stripe further actuates a high level trigger circuit that synchronizes the steering circuit during each revolution of the rotor.

INVENTORS
JOHN L. HOOD
JOE H. McGEE
BY Joseph M. Roehl
ATTORNEY

INVENTORS
JOHN L. HOOD
JOE H. McGEE
BY *Joseph M. Roehl*
ATTORNEY

LIGHT ACTUATED BRUSHLESS DC MOTOR

BACKGROUND OF THE INVENTION

1. Field of the Invention

This invention relates to direct current motors and more particularly to brushless direct current motors using an optical commutating system.

2. Description of the Prior Art

Direct current motors containing a wound stator and a permanent magnet rotor are well known in the art. These motors, commonly referred to as "brushless DC motors," have found wide application in situations where commutator arcing and other problems of like nature must be avoided.

A variety of optical schemes have been devised for commutating such motors. In some of these schemes, bursts of light are produced at appropriate times during each revolution of the rotor. These bursts of light are used to actuate electronic circuits that energize appropriate stator coils so as to maintain rotor revolution. This type of commutation, however, suffers from the fact that in the event of a power failure or other external interference, the proper sequence of energizing individual stator coils is disturbed and the motor fails to operate in the intended manner.

SUMMARY OF THE INVENTION

The present invention provides accurate commutation for brushless DC motors by providing signals at specified positions of each revolution of the rotor and using these signals to synchronize the instantaneous direction of the magnetic stator field with the rotor position.

DESCRIPTION OF THE PREFERRED EMBODIMENTS

Figure 1:
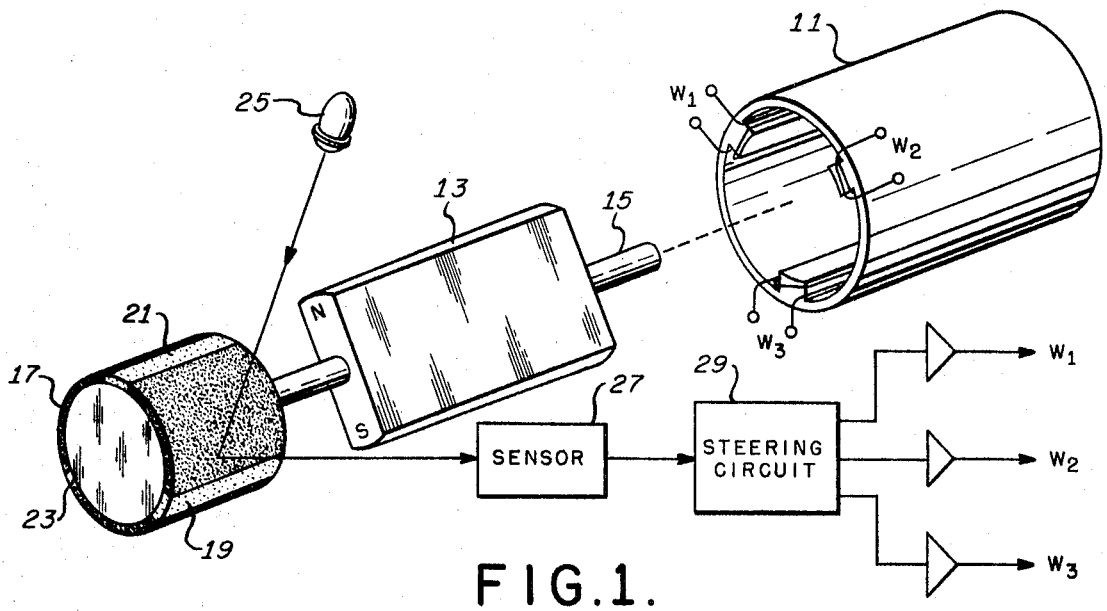
FIG. 1 is an exploded view, partly in perspective, illustrating the general class of motors to which the principles of the present invention may be applied.

FIG. 1 illustrates a brushless DC motor of the type to which the present invention may be applied. A stator 11 contains three poles. Each pole is wound with a winding indicated as $W_1$, $W_2$ and $W_3$, respectively. Each of these windings is wound in a direction so that, when energized, it will attract the North pole of a permanent magnet rotor.

The rotor 13 is shown as a flat slab magnetized to contain a North pole near one edge of the slab and a South pole near the opposite edge of the slab.

In practical applications, the rotor might consist of a solid cylinder magnetized along a diameter.

The rotor 13 is mounted on shaft 15. A commutating cylinder 17 is also mounted integrally on the shaft 15 so as to rotate with the rotor 13.

The commutating cylinder contains a plurality of light reflecting stripes 19, 21 and 23. Each reflecting stripe corresponds to an individual stator winding. In the situation illustrated, the stripe 23 corresponds to the stator winding $W_1$, the stripe 19 corresponds to the stator winding $W_2$ and the stripe 21 corresponds to the stator winding $W_3$.

The surface of the commutating cylinder 17 between these reflecting stripes contains a surface having a low degree of reflectivity so that substantially no light will be reflected from these areas. A light source 25 is arranged to focus a narrow beam of light onto the surface of the commutating cylinder. Any light that is reflected from the commutating cylinder travels to a sensor 27 which may be any suitable type of photodetector. The sensor 27 produces an electrical output signal corresponding to the instantaneous intensity of the received light beam.

The electrical signal from the sensor 27 is applied to a steering circuit 29 which in turn provides an electrical current to the appropriate windings $W_1$, $W_2$ and $W_3$ as indicated.

As the rotor and the commutating cylinder rotate, a burst of light will be applied to the sensor 27 each time that a reflecting stripe traverses the light beam. The burst of light causes a switching pulse to be applied to the steering circuit. This actuates the steering circuit so as to switch the electrical signal from one stator winding to the next in an orderly and cyclical manner.

The reflecting stripes are positioned on the commutating cylinder 17 so that a burst of light will be produced just before the N-S axis of the rotor 13 becomes aligned with the centerline of a given stator pole.

Thus, an appropriate stator pole is magnetized and attracts the North pole of the rotor. Just before the North pole becomes directly aligned, however, the steering circuit energizes the following stator pole and deenergizes the first stator pole.

Figure 2:
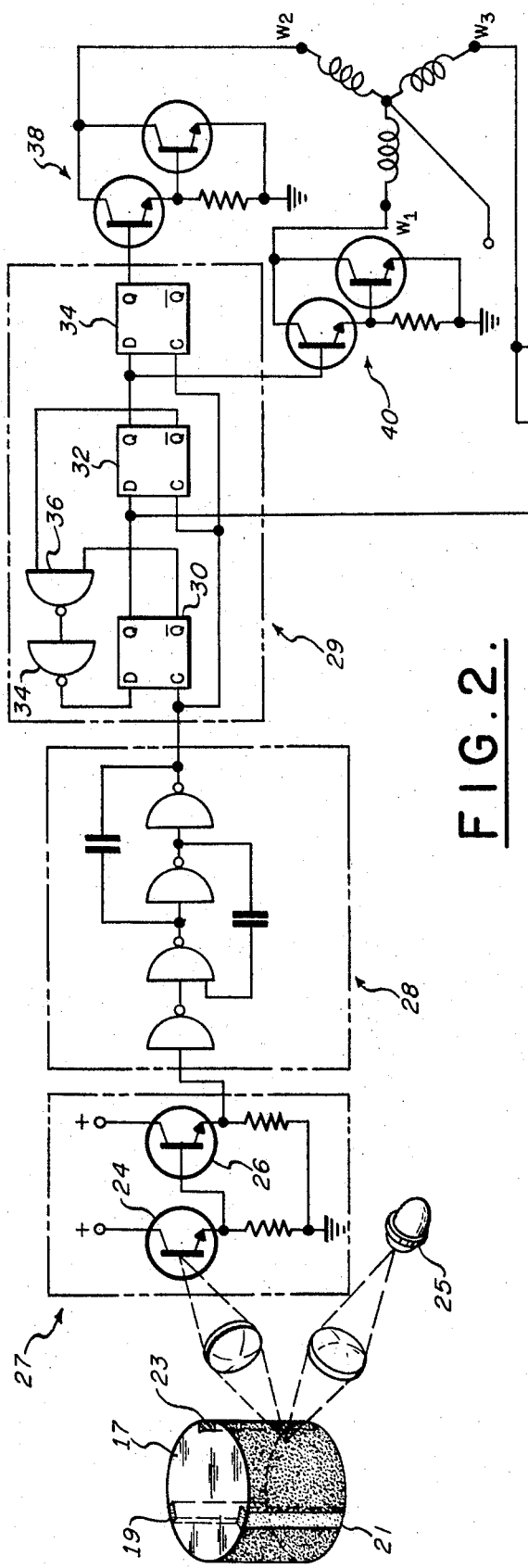
FIG. 2 is a diagram illustrating one embodiment of the invention.

FIG. 2 illustrates one embodiment of the present invention. The commutating cylinder 17 again contains three reflective stripes 19, 21 and 23. Light from the source 25 is reflected from the commutating cylinder into the sensing means 27. The sensing means contains a photodetector 24 and an amplifier 26. Output signals from the sensing means are passed through a shaper circuit 28 which serves as a filter to provide clean pulses to the steering circuit 29.

The steering circuit is essentially a three stage circulating counter. As presently preferred, this counter utilizes conventional "D" flip-flop circuits 30, 32 and 34. As known in the prior art, these flip-flops are characterized in that an input steering circuit is essentially to the C (clock) input terminal will switch the flip-flop to the binary ONE state so as to provide a Q output only when the input signal is accompanied by a suitable voltage applied to the D input terminal. If the flip-flop is in the binary ZERO state in which a $\overline{Q}$ voltage is being supplied, and an input signal is applied to the clock input terminal without an accompanying voltage being applied to the D input terminal, the flip-flop will remain in the binary ZERO state.

Conversely, if the flip-flop is originally in the binary ONE state, an input signal supplied to the clock input terminal will switch the flip-flop to the binary ZERO state unless it is accompanied by a voltage being applied to the D input terminal.

The steering circuit of FIG. 2 also includes a pair of inhibit gates 34 and 36 connected in feedback relationship so that an input signal will be applied to the D input terminal of flip-flop 30 only if flip-flops 30 and 32 are both in the binary ZERO state.

Amplifying means 38, 40 and 42 are connected in the output circuit of flip-flop stages 34, 32 and 30, respectively. The amplifying stages are connected so that they will pass an energizing current to the associated stator coil in the motor when the corresponding flip-flop is in the binary ONE condition.

Assume for example that the steering circuit is originally in the 1 0 0 state. Under these conditions, a feedback signal will not be present at the input terminal of the stage 30 since that stage is in the binary ONE state. The first pulse that is received from the shaping circuit 28 will thus switch the first stage 30 to the binary ZERO state. Since the same input pulse is also applied to the clock input terminals of the stages 32 and 34, the stage 32 will be switched to the binary ZERO state since it was receiving an input signal at its D input terminal at the time the pulse occurred. Flip-flop 34, however, will remain in the binary ZERO state since it was receiving no input signal at its D input terminal. The steering circuit will now be in the 0 1 0 state. Under these conditions, the feedback circuit will still not produce an input signal at the D input terminal of stage 30. The next pulse that is received from the shaping circuit 28 will again be applied to the clock input terminals in each flip-flop. Since stage 30 is not receiving a feedback signal, it will remain in the binary ZERO state.

Stage 32 will be switched to the binary ZERO state since it will have no voltage applied to its D input terminal at the time that the switching pulse occurs. Stage 34, however, will be switched to the binary ONE state since it had been receiving an input signal at its D input terminal when the switching pulse occurred. The steering circuit is now in the 0 0 1 binary state.

At this time, both stages 30 and 32 are in the binary ZERO state so that an input signal is being applied through the feedback circuit to the D input terminal of the stage 30. Thus, the next input pulse will cause the stage 30 to be switched to the binary ONE state. At the same time, the stage 32 will remain in the binary ZERO state and the stage 34 will be switched again to the binary ZERO state. The steering circuit is now in the 1 0 0 binary state and the cycle can again be repeated.

Concurrently with these changes in binary state in the steering circuit, the various stator coils in the motor would be energized sequentially. This energization would cause rotation of the permanent magnet rotor as it was urged into alignment with successive changes in direction of the magnetic field established by the stator coils.

In the device described above, all of the reflecting stripes were made so as to have the same degree of reflectivity. In the event of a power failure, or other external disturbances, the rotor might coast to a stop. When power was again applied, the orderly sequence of stator winding energization might no longer correspond to the instantaneous position of the rotor. Thus, the motor might fail to operate properly.

Motors constructed according to the preferred form of the present invention include a commutating cylinder having one stripe with a different degree of reflectivity from the rest. Thus, reflecting stripe 23 may have a high degree of reflectivity whereas stripes 19 and 21 would have the same degree of reflectivity intermediate the reflectivity of the stripe 23 and the low reflectivity of the commutating cylinder itself. In this way, the high reflectivity stripe 23 is a synchronizing stripe that provides a coded signal to synchronize the position of the rotor with the stator coil energization.

Figure 3:
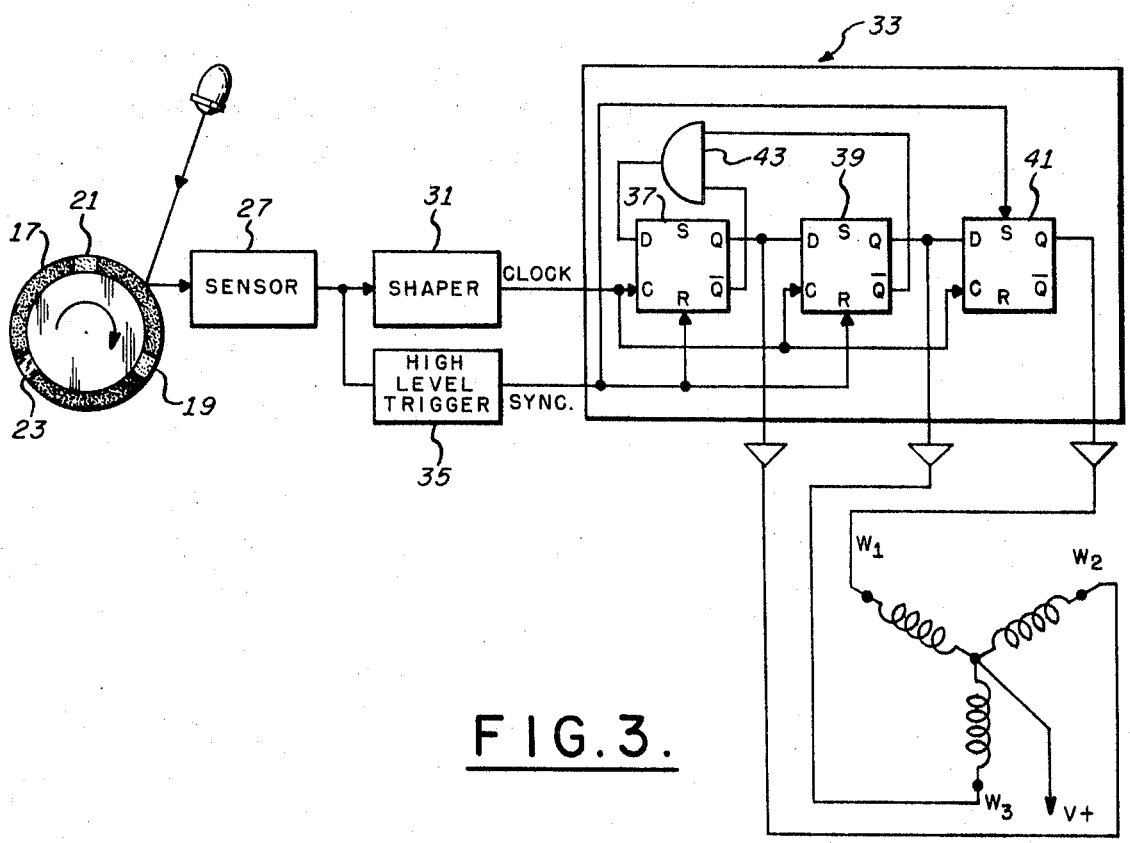
FIG. 3 is a diagram illustrating a presently preferred embodiment of the invention.

The principles of this form of the invention may be better understood by referring to the schematic diagram of FIG. 3.

In this diagram, the source 25 reflects light from the commutating cylinder 17 onto the sensor 27. The reflecting stripes 19 and 21 again represent intermediate reflectivity stripes and the stripe 23 again represents the high reflectivity synchronizing stripe.

The output of the sensor 27 is applied to a wave shaper 31. The wave shaper may be a conventional trigger that effectively operates as a filter to provide a clean clock pulse suitable for actuating a sequence generator 33.

The sequence generator is essentially a recirculating shift register having three possible binary states: 1 0 0, 0 1 0, and 0 0 1. Successive clock pulses trigger the sequence generator into the states sequentially and cyclically.

Although recirculating shift registers of various types are known in the art, the presently preferred embodiments of the invention utilize a register having three stages, each containing a conventional "D" flip-flop. These flip-flops are constructed so that an impulse applied to the clock input terminal C will leave the flip-flop in the $\overline{Q}$ state if no signal is being applied to the D input terminal at that time. If, however, a signal is being applied to the D input terminal at the same time that a clock pulse is being applied, the flip-flop will thereafter provide a Q output. The flip-flop may be considered to be in the binary ONE state when a Q output is being provided and in the binary ZERO state when a $\overline{Q}$ signal is being provided. These flip-flops further include SET and RESET terminals that permit the flip-flop to be clamped to the Q or $\overline{Q}$ state regardless of the occurrence of clock or "D" signals.

The steering circuit also contains a high level trigger 35 which is actuated only when the signal from the sensor 27 exceeds a predetermined threshold value. The trigger 35 may comprise any suitable threshold circuit, such as a Schmitt trigger. The trigger circuit is set so that it will not respond to a pulse from the sensor that occurs when a low reflectivity stripe traverses the light beam, but will respond when the high reflectivity stripe 23 traverses the light beam so as to produce a coded signal. The output of the trigger circuit 35 constitutes a synchronizing signal.

The clock pulses from the shaper 31 are applied to each flip-flop. The Q output terminal of the flip-flop 37 is connected to the D input terminal of a flip-flop 39 and the Q output terminal of the flip-flop 39 is connected to the D input terminal of a flip-flop 41.

The $\overline{Q}$ outputs of the flip-flops 37 and 39 are applied through an AND gate 43 to the D input terminal of the flip-flop 37. The synchronizing signal from the trigger 35 is applied to RESET terminals on the flip-flops 37 and 39 and to the SET terminal of the flip-flop 41.

A synchronizing signal overrides the effect of clock pulses and the previous binary state of the flip-flop and inevitably leaves the sequence generator in the binary 0 0 1 state.

The Q outputs of the individual flip-flops 37, 39, and 41 are amplified and applied to the $W_2$, $W_3$ and $W_1$ stator windings, respectively.

The operation of the circuit may be understood by considering the sequence generator to be originally in the 1 0 0 state, and the rotor to be rotating in the clockwise direction. Under these conditions, the $W_2$ stator coil will be energized and the rotor will be rotating clockwise so that the North pole of the rotor is approaching the $W_2$ winding. As the stripe 21 traverses the light beam, a clock pulse will be produced. Since the flip-flop 37 was in the binary ONE state, it did not produce a $\overline{Q}$ signal and the gate 43 was closed. Thus, the flip-flop 37 will be switched to the binary ZERO state by the clock pulse. When the clock pulse occurred, however, the flip-flop 37 was applying a signal to the D terminal of the flip-flop 39 so that flip-flop 39 will be switched to the binary ONE state by the same clock pulse. When the same clock pulse occurred, the flip-flop 39 was not producing a Q signal so that the flip-flop 41 would remain in the binary ZERO state. Since the stripe 21 has only an intermediate reflectivity, the signal from the sensor is insufficient to trigger the high level trigger circuit 35. The sequence generator is now in the binary 0 1 0 state, and the North pole of the rotor is approaching the $W_3$ stator coil.

The next clock pulse occurs when the high reflectivity stripe 23 sweeps through the light beam. Since the flip-flop 39 is now in the binary ONE state, the gate 43 remains closed. Therefore, the flip-flop 37 will remain in the binary ZERO state. Under these conditions, no signal will be applied to the D terminal of the flip-flop 39. Thus, the clock pulse will switch this flip-flop to the binary ZERO state. When the clock pulse occurred, however, the flip-flop 39 was in the binary ONE state so that a voltage was being applied to the D terminal of the flip-flop 41. This, in conjunction with the clock pulse, switches the flip-flop 41 to the binary ONE state. The stripe 23 that causes the latter clock pulse to occur has a high degree of reflectivity. A synchronizing signal is produced at this time. However, since the clock pulse switched the sequence generator to the 0 0 1 binary state, the synchronizing pulse has no effect.

As the rotor continues to rotate, the intermediate reflectivity stripe 19 next traverses the light beam. Since the flip-flops 37 and 39 are in the binary ZERO state when the resulting clock pulse occurs, the gate 43 is open and a voltage is applied to the D terminal of the flip-flop 37. This permits the flip-flop 37 to be switched to the binary ONE state. Since the flip-flop 37 was in the binary ZERO state when the clock pulse occurred, the flip-flop 39 will remain in the binary ZERO state under these conditions. The flip-flop 41 which was in the binary ONE state when the clock pulse appeared will be switched to the binary ZERO state by this clock pulse since no voltage is being applied to its D terminal. The sequence generator is again in the 1 0 0 state.

Consider now the operation of a motor without synchronizing means in the event of a power failure.

Assume that when the power failure occurs, the rotor comes to a stop in a position such that the South pole of the rotor is just beyond the stator winding $W_2$. Assume further that when power is restored, the sequence generator assumes the binary 1 0 0 state so that the stator coil $W_2$ is energized. The rotor will accelerate in the clockwise direction principally because of the repulsion force established between the energized stator winding and the South pole of the rotor. When the North pole passes the stator winding $W_1$, a clock pulse will be produced which will deenergize winding $W_2$ and energize winding $W_3$. This will cause the rotor to decelerate until it stops and reverses direction of rotation.

With the coded pulse providing synchronization as taught in the present invention, however, normal operation is restored within one revolution.

Again assume a condition in which a power failure leaves the rotor in a position such that the South pole is just beyond the stator winding $W_2$ and in which the sequence generator assumes a binary 1 0 0 state when power is restored. The rotor will again be accelerated in the clockwise direction as was the case in the previous example. The rotor will lag the magnetic field as before, until the North pole of the rotor approaches the stator winding $W_3$. At this time, the winding $W_1$ will have been energized. As the rotor sweeps by the winding $W_3$, a clock pulse and a synchronizing pulse are produced. The clock pulse would originally deenergize the winding $W_1$ and energize the winding $W_2$. However, the synchronizing pulse overrides the effects of the clock pulse and clamps the sequence generator in the binary 0 0 1 state so as to maintain the coil $W_1$ in the energized condition. In this way, the magnetic field catches up" to the rotor and operation can then resume in the normal manner. In the event that the rotor does not have sufficient momentum to maintain clockwise rotation, the rotor will oscillate temporarily but will quickly be synchronized with the magnetic field and normal operation will again be restored.

Figure 4:
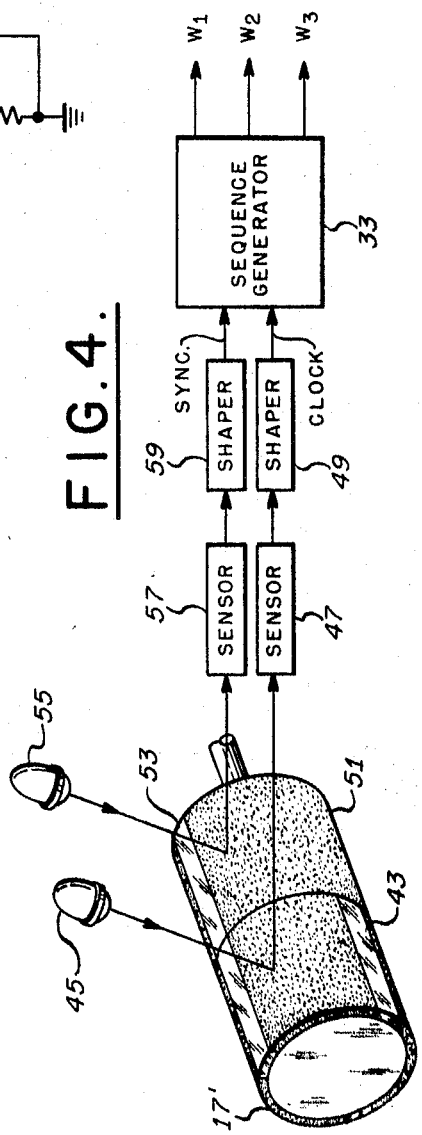
FIG. 4 is a diagram illustrating another embodiment of the invention.

Another embodiment of the invention is illustrated in FIG. 4. In this embodiment, the commutating cylinder 17' contains two sections. The first section 43 contains three reflecting stripes each having the same high degree of reflectivity. These stripes reflect light from a first source 45 onto a sensor 47. The output of the sensor 47 is applied to a shaper circuit 49 to produce a clock pulse that actuates the sequence generator 33. The sequence generator 33 is of the same general configuration as the corresponding sequence generator illustrated in FIG. 3. The commutating cylinder 17' also contains a second section 51. This section contains only a single high reflectivity synchronizing stripe 53 that is used solely for synchronizing the system. Light from a source 55 thus produces a burst of light that is used as a coded pulse which is reflected onto the sensor 57 once during each revolution when the stripe 53 sweeps through the light beam. The output of the sensor 57 is applied to the shaper circuit 59 circuit 59 and constitutes a synchronizing pulse that is applied to the sequence generator 33.

The clock and synchronizing pulses operate on the sequence generator 33 in the same fashion as the corresponding pulses operated on the sequence generator and the circuit of FIG. 3.

In this latter embodiment, since a separate stripe is used solely for synchronization, and since a separate optical system is used for the resultant optical coded pulse, the synchronizing stripe need no longer have a unique level of reflectivity, but may have the same degree of reflectivity as the remaining stripes.

If desired, the various stripes may have reflectivities less than the surface of the cylindrical commutating member. The relative degrees of reflectivity have been described in a certain order merely for purposes of illustration.

In some applications, it may be preferred to use an optical system in which the light beam is passed through the various stripes rather than reflected from these stripes. In such systems, the stripes would have various degrees of opacity to obtain coded and clock pulses of light.

In general, the stripes may be considered light attenuators since they govern the percentage of the light emitted by the source that ultimately reaches the sensor during various pulses.

Although optical sources are presently preferred, other types of radiant energy may be substituted if desired.

The embodiments have been described as having three stator coils. Motors having any reasonable odd number of stator coils may take advantage of the principles of the invention.

While the invention has been described in its preferred embodiments, it is to be understood that the words which have been used are words of description rather than limitation and that changes may be made without departing from the true scope and spirit of the invention in its broader aspects.

We claim:

1. An improved light-actuated brushless DC motor of the type which includes a permanently magnetized rotor, a plurality of stator coils, each energizable to attract the same magnetic pole of said rotor, a cylindrical commutating member rotatable with said rotor for modulating a light beam, sensing means responsive to modulations of said light beam, and a sequence generator for sequentially energizing said stator coils in response to successive pulses of light reaching said sensing means; the improvement comprising a plurality of light attenuating stripes on said commutating means, said stripes providing a level of attenuation different from that provided by the surface of said cylindrical commutating member, said stripes being disposed so that a stripe traverses the light beam each time that the North pole of the magnetized rotor approaches the axis of a stator coil, said plurality of stripes further including one stripe constructed so that it produces a coded pulse of light at a predetermined rotor position during each revolution, said sequence generator including means responsive to said coded pulse for clamping the sequence generator to a predetermined state regardless of the previous condition of the sequence generator.

2. The apparatus of claim 1 in which said attenuating stripes are light reflecting members having a degree of reflectivity different from that of the surface of said cylindrical commutating member.

3. The apparatus of claim 1 in which said one stripe has a high degree of reflectivity, in which the remainder of said plurality of stripes has an intermediate degree of reflectivity, and in which the surface of said cylindrical commutating member has a low degree of reflectivity.

4. The apparatus of claim 1 in which the sequence generator is a recirculating shift register having a number of stages equal to the number of stator coils, said shift register being connected so that each stage energizes the corresponding stator coil only when that stage is in the binary ONE state.

5. The apparatus of claim 3 in which said clamping means includes a threshold circuit connected to said sensing means for producing a synchronizing pulse only in response to a light pulse produced when said one stripe traverses the light beam, said clamping means further including means to set each stage of the sequence generator to a predetermined value.

6. The apparatus of claim 1 in which the sequence generator is a circulating shift register containing a clock input terminal for shifting the stable state from one value to the next in a predetermined sequence, and a synchronization input terminal for clamping the register to a predetermined binary state.

7. The apparatus of claim 5 in which the reflecting stripes all have the same high degree of reflectivity, and in which the commutating member includes first and second cylindrical sections, said first section containing only said one stripe, said second section containing the remaining stripes of said plurality, said apparatus further being characterized in that said sensing means includes first and second sensors arranged to receive pulses of light from said first and second sections respectively, said first sensor being coupled to said synchronization input terminal and said second sensor being coupled to said clock input terminal.

8. A brushless DC motor comprising a permanent magnet rotor rotatable about an axis, said rotor containing a pair of magnetic poles, a plurality of stator coils spaced at equiangular intervals around said axis, each of said coils being energizable to attract the same specified magnetic pole of said rotor, a source of radiant energy, sensing means responsive to energy from said source, cylindrical commutating means rotatable with said rotor, said cylindrical commutating means being mounted coaxially on said rotor and positioned so that some portion of its cylindrical surface is in the path of energy propagating between said source and said sensor, attenuating means distributed on the surface of said cylindrical commutating means, said attenuating means providing a level of attenuation to said radiant energy different from the attenuation provided by said cylindrical surface, said attenuating means being arranged on said cylindrical surface so as to traverse the beam of energy from said source as the rotor rotates whereby pulses of energy are supplied to said sensing means, said sensing means being constructed to produce electrical pulses representative of received radiant energy pulses, said attenuating means being further positioned to provide a pulse of radiant energy to said sensing means whenever said specified magnetic pole approaches the axis of a stator coil, means for providing excitation current to selected individual stator windings, sequence generating means for switching said excitation current from one stator winding to another in a predetermined cyclical sequence in response to successive pulses from said sensing means, means in said attenuating means for providing a coded pulse of radiant energy at one specific point during each revolution of the rotor and means in said sequence generating means for assuring that excitation current is applied to a specific stator coil in response to a coded pulse.